(12) United States Patent
Chen (10) Patent No.: US 8,097,477 B2
(45) Date of Patent: Jan. 17, 2012

(54) METHOD FOR FORMING A LIGHT-EMITTING CASE AND RELATED LIGHT-EMITTING MODULE

(75) Inventor: Chih-Kang Chen, Maio-Li Hsien (TW)

(73) Assignees: Silitek Electronic (Guangzhou) Co., Ltd., Guangzhou (CN); Lite-On Technology Corporation, Taipei (TW)

(*) Notice: Subject to any disclaimer, the term of this patent is extended or adjusted under 35 U.S.C. 154(b) by 335 days.

(21) Appl. No.: 12/427,764

(22) Filed: Apr. 22, 2009

(65) Prior Publication Data

US 2010/0200889 A1  Aug. 12, 2010

(30) Foreign Application Priority Data

Feb. 11, 2009 (CN) .......................... 2009 1 0008878

(51) Int. Cl.
*H01L 33/00* (2010.01)
(52) U.S. Cl. ............ 438/26; 438/28; 257/100; 257/433; 257/787; 257/E23.116; 257/E23.123
(58) Field of Classification Search .................... 438/26, 438/28; 257/100, 433, 787, 788, E51.02, 257/E33.056, E33.059, E23.116, E23.123
See application file for complete search history.

(56) References Cited

U.S. PATENT DOCUMENTS

| | | | |
|---|---|---|---|
| 5,998,877 A * | 12/1999 | Ohuchi | 257/787 |
| 2006/0099731 A1* | 5/2006 | Buckley et al. | 438/99 |
| 2007/0284993 A1* | 12/2007 | Kim et al. | 313/483 |

* cited by examiner

*Primary Examiner* — Matthew Landau
*Assistant Examiner* — Colleen E Snow
(74) *Attorney, Agent, or Firm* — Li & Cai Intellectual Property (USA) Office (57) ABSTRACT

A method for manufacturing a light-emitting case includes forming a PLED (Polymer Light Emitting Diode) device, disposing the PLED device into a mold, and utilizing the mold to sheathe the PLED device with transparent plastic material in an injection-molding manner. Since the mold has a cavity corresponding to a predetermined shape, the formed transparent plastic material has a geometric appearance corresponding to the predetermined shape.

14 Claims, 7 Drawing Sheets

METHOD FOR FORMING A LIGHT-EMITTING CASE AND RELATED LIGHT-EMITTING MODULE

BACKGROUND OF THE INVENTION

1. Field of the Invention

The present invention relates to a method for forming a light-emitting case and a related light-emitting module, and more specifically, to a method for utilizing an IMD (In-Mold Decoration) process to sheathe a PLED device with a case and a related light-emitting module.

2. Description of the Prior Art

In general, a light-emitting case is usually used for illuminated display of models, trademarks, or function key patterns on an electronic device, providing additional light in a dark environment, or generating a flashing warning.

In the following, illuminated display of function key patterns on a mobile phone is taken as an example. A common method involves disposing a spot light source (e.g. a white LED) or a surface light source (e.g. a cold light source) under a transparent control board where a pattern layer corresponding to the function key patterns is printed. When a user wants to use the function keys to perform corresponding operations (e.g. answering the phone, sending messages, dialing phone numbers, etc.), the said light source disposed under the transparent control board is switched on. Subsequently, light emitted by the light source passes through the pattern layer so that the function key patterns on the pattern layer may be illuminated accordingly. Thus, even in a dark environment, the user may still view the locations of the function keys clearly.

Figure 1:
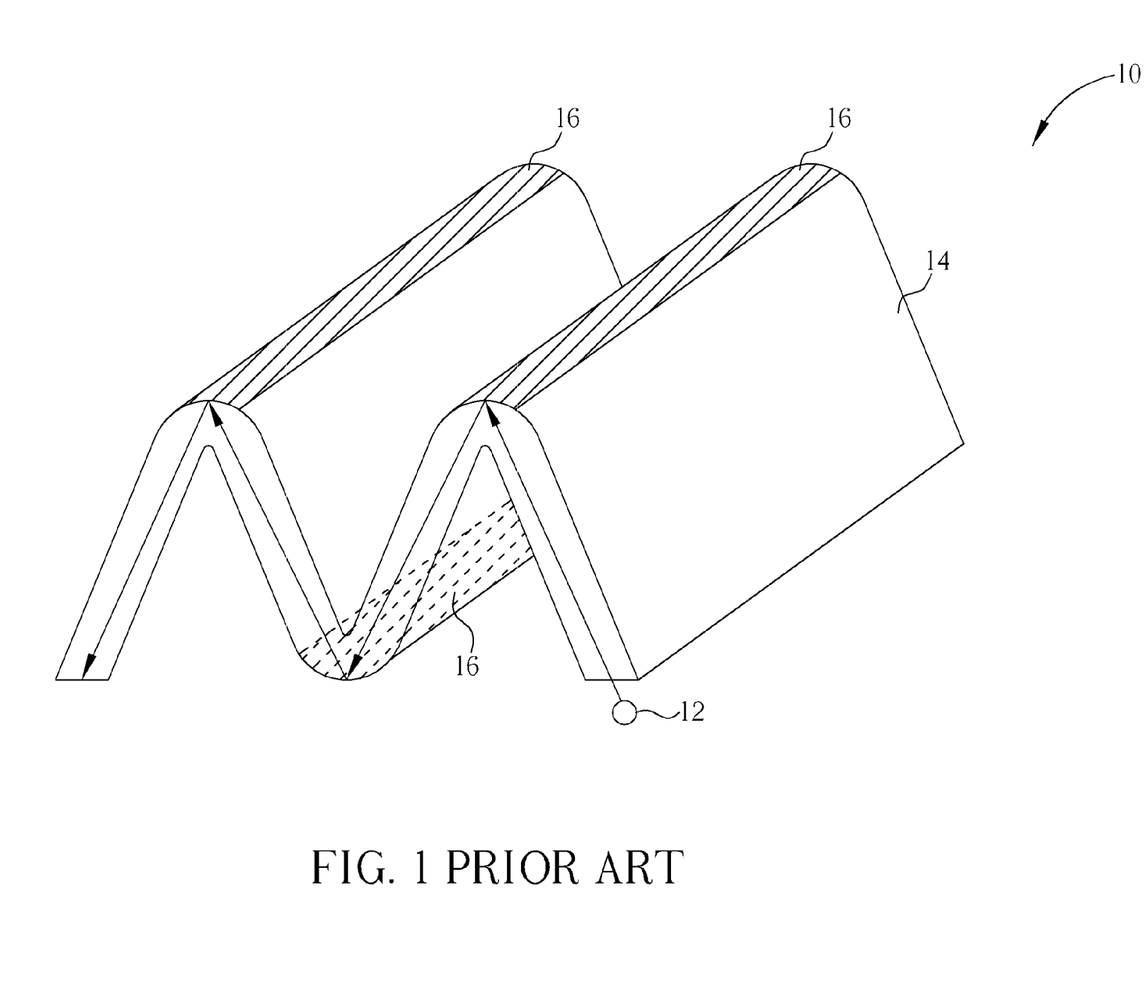
FIG. 1 is a diagram of a light-emitting module according to the prior art.

Please refer to FIG. 1, which is a diagram of a light-emitting module 10 according to the prior art. As shown in FIG. 1, the light-emitting module 10 utilizes a spot light source 12 for brightening a case 14. In order to generate uniform light distribution on the case 14, it is necessary to dispose a light guide mechanism on the light-emitting module 10. However, the additional light guide mechanism may not only complicate the structural design of the light-emitting module 10, but may also increase the manufacturing cost of the light-emitting module 10.

Furthermore, as shown in FIG. 1, if the case 14 has a curved surface, disposal of additional reflection pads 16 along with the curved surface is necessary for guiding light toward each portion of the case 14 uniformly. However, the said complicated disposal of the reflection pads 16 may ruin the appearance of the light-emitting module 10. Furthermore, brightness attenuation caused by multiple reflections of light may also result in uneven brightness distribution on the light-emitting module 10.

Thus, how to manufacture a light-emitting case capable of generating uniform light distribution without an additional light-guide mechanism that is suitable for a curved surface should be a concern in light-emitting module structural design.

SUMMARY OF THE INVENTION

The present invention provides a method for manufacturing a light-emitting case comprising forming a PLED (Polymer Light Emitting Diode) device, the PLED device at least having a light-emitting layer and an electrode set formed on the light-emitting layer; disposing the PLED device into a mold, the mold having a cavity corresponding to a predetermined shape; and utilizing the mold to sheathe the PLED device with transparent plastic material in an injection-molding manner; wherein the formed transparent plastic material has a geometric appearance corresponding to the predetermined shape.

The present invention further provides a light-emitting module having a PLED comprising a PLED device comprising a light-emitting layer; and an electrode set electrically connected to the light-emitting layer, the electrode set used for controlling the light-emitting layer to emit light or not; and a case structure formed with the PLED device in a mold by an injection molding method, the mold having a cavity corresponding to a predetermined shape, the formed case structure sheathing the PLED device and having a geometric appearance corresponding to the predetermined shape.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
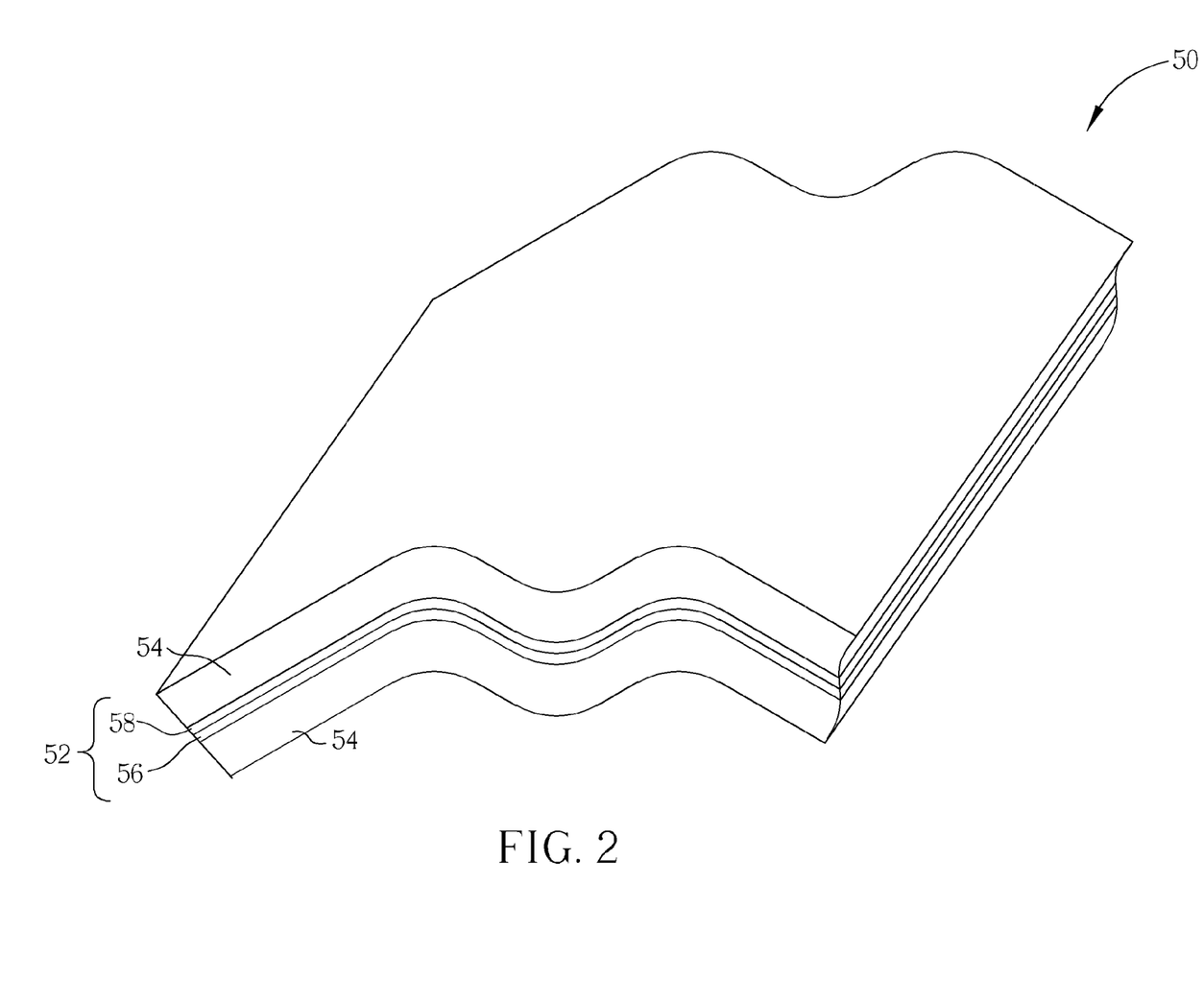
FIG. 2 is a partial diagram of a light-emitting module according to a preferred embodiment of the present invention.

Please refer to FIG. 2, which is a partial diagram of a light-emitting module 50 according to a preferred embodiment of the present invention. The light-emitting module 50 comprises a PLED device 52 and a case structure 54. As shown in FIG. 2, the case structure 54 sheathes the PLED device 52 for protection of the PLED device 52. The case structure 54 is preferably a case corresponding to an electronic device (e.g. a mobile phone, a notebook, etc.), and is preferably made of ABS (Acrylonitrile-Butadiene-Styrene) material. The PLED device 52 at least comprises a light-emitting layer 56 and an electrode set 58. The electrode set 58 is formed on and electrically connected to the light-emitting layer 56. Generally speaking, the electrode set 58 may comprise common PLED electrode elements, such as a metal negative pole and an ITO positive pole, for controlling the light-emitting layer 56 to emit light or not.

Figure 3:
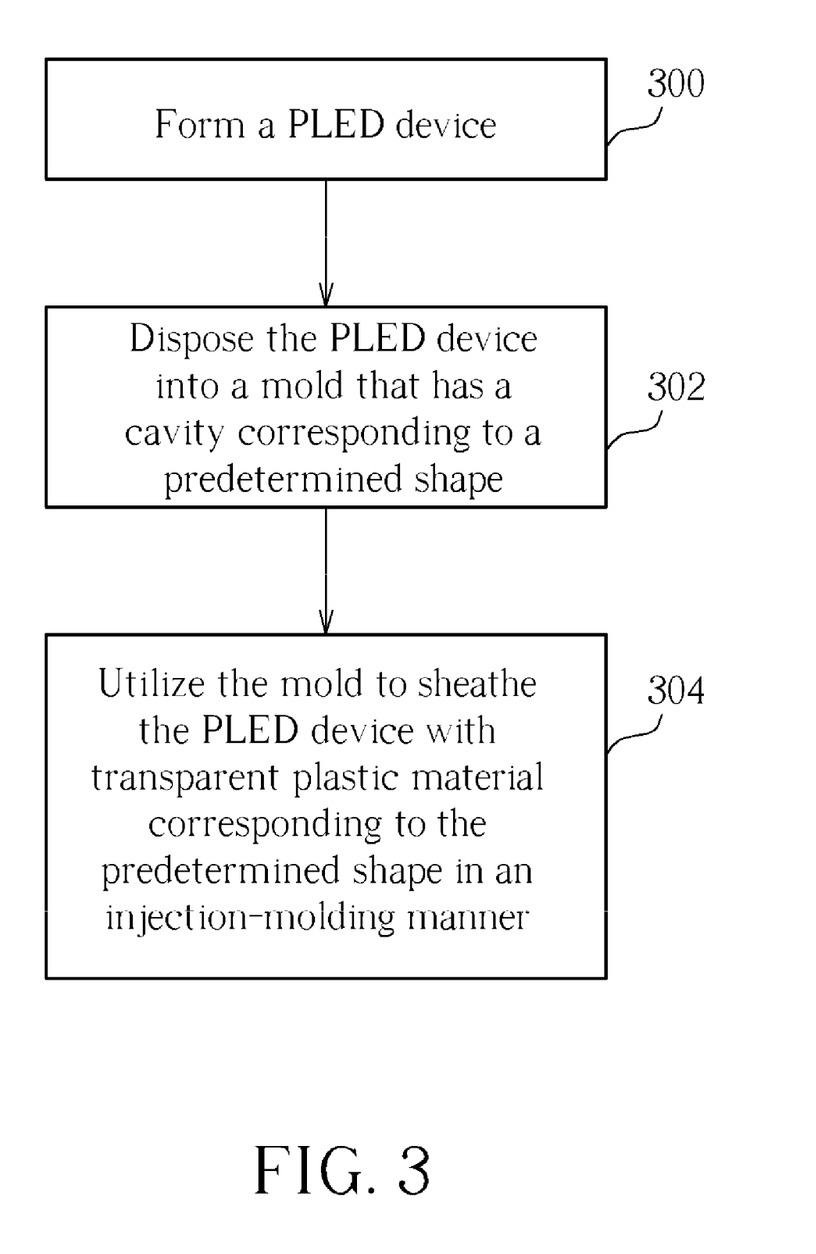
FIG. 3 is a flowchart of forming the light-emitting module in FIG. 2.

More detailed description for the light-emitting module 50 is provided as follows. Please refer to FIG. 3, which is a flowchart of forming the light-emitting module 50 in FIG. 2. As shown in FIG. 3, the PLED device 52 is formed (Step 300). A PLED is an LED that utilizes conjugated polymer material as a light-emitting layer. The light-emitting principle of the PLED involves applying voltage to a metal negative pole and an ITO positive pole on the conjugated polymer material. As a result, electrons provided by the metal negative pole and holes provided by the ITO positive pole may be driven by the applied voltage to combine in the conjugated polymer material, so as to emit light. Compared with an OLED (Organic Light Emitting Diode), in which an LED film is formed by a time-consuming and strenuous vapor deposition process, the PLED device 52 may be formed by a simple and time-saving coating process, since conjugated polymer material used in the PLED device 54 may be dissolved in a dissolvent. The said coating process may be a commonly-used coating technology in the prior art, such as a spin coating process, an ink-jet printing process, a screen printing process, etc., and the related description is therefore omitted herein.

After forming the PLED device 52, an IMD process is then utilized to sheathed the PLED device 52 with the case structure 54. The said IMD process involves disposing a plastic film with printed patterns into a mold, utilizing a vacuum process to make the shape of the plastic film correspond to a shape of a cavity in the mold, and then injecting melted thermoplastic material into the mold. After the melted thermoplastic material is cooled down and solidified in the mold, the thermoplastic material may be connected to the back surface of the plastic film where the patterns are printed, so that a pattern layer protected by the plastic film is formed correspondingly on the solidified thermoplastic material. The said IMD process is commonly applied for electronic device surface decoration.

Figure 4:
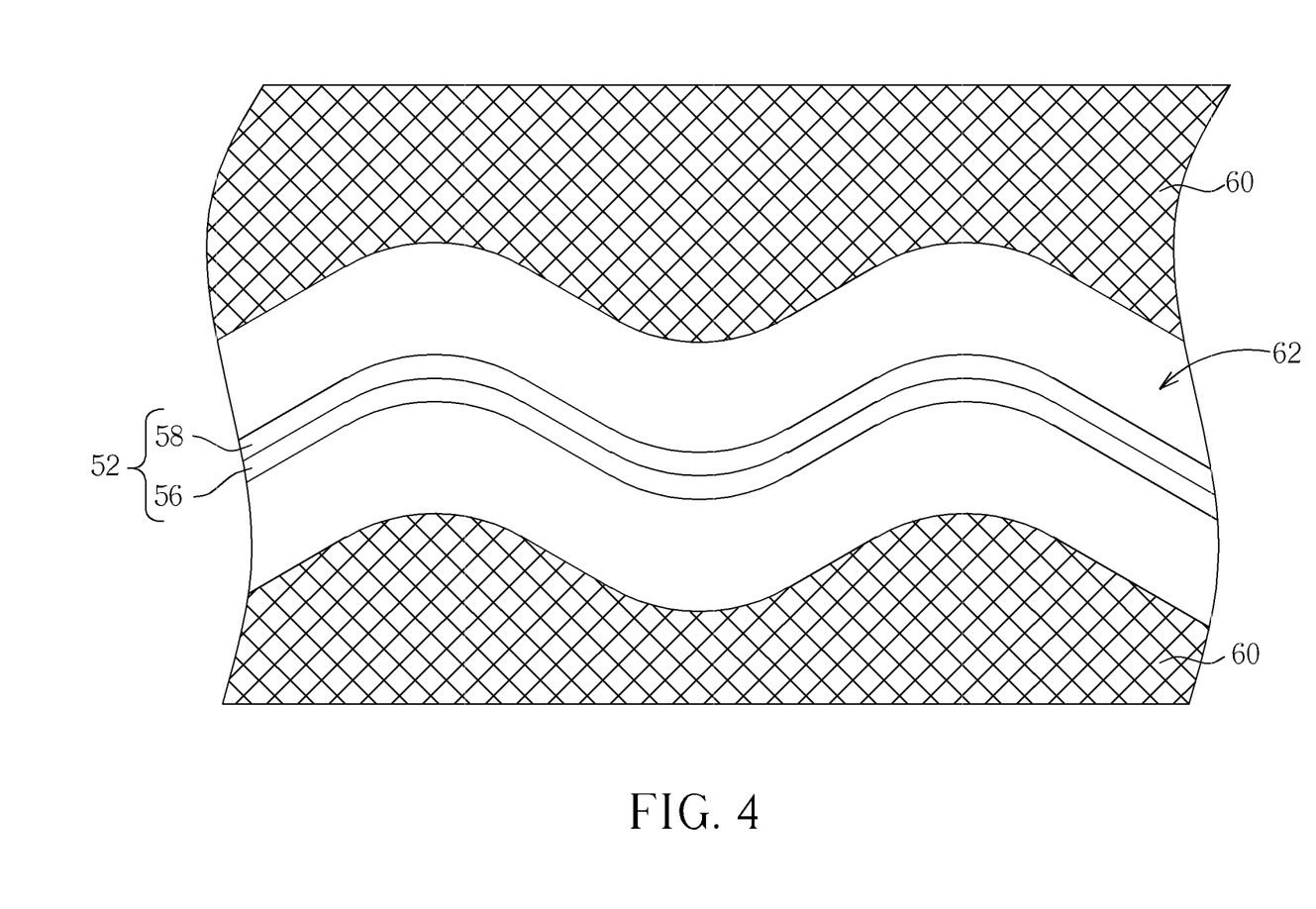
FIG. 4 is a partial cross-sectional diagram of the PLED device being disposed in the mold.
Figure 5:
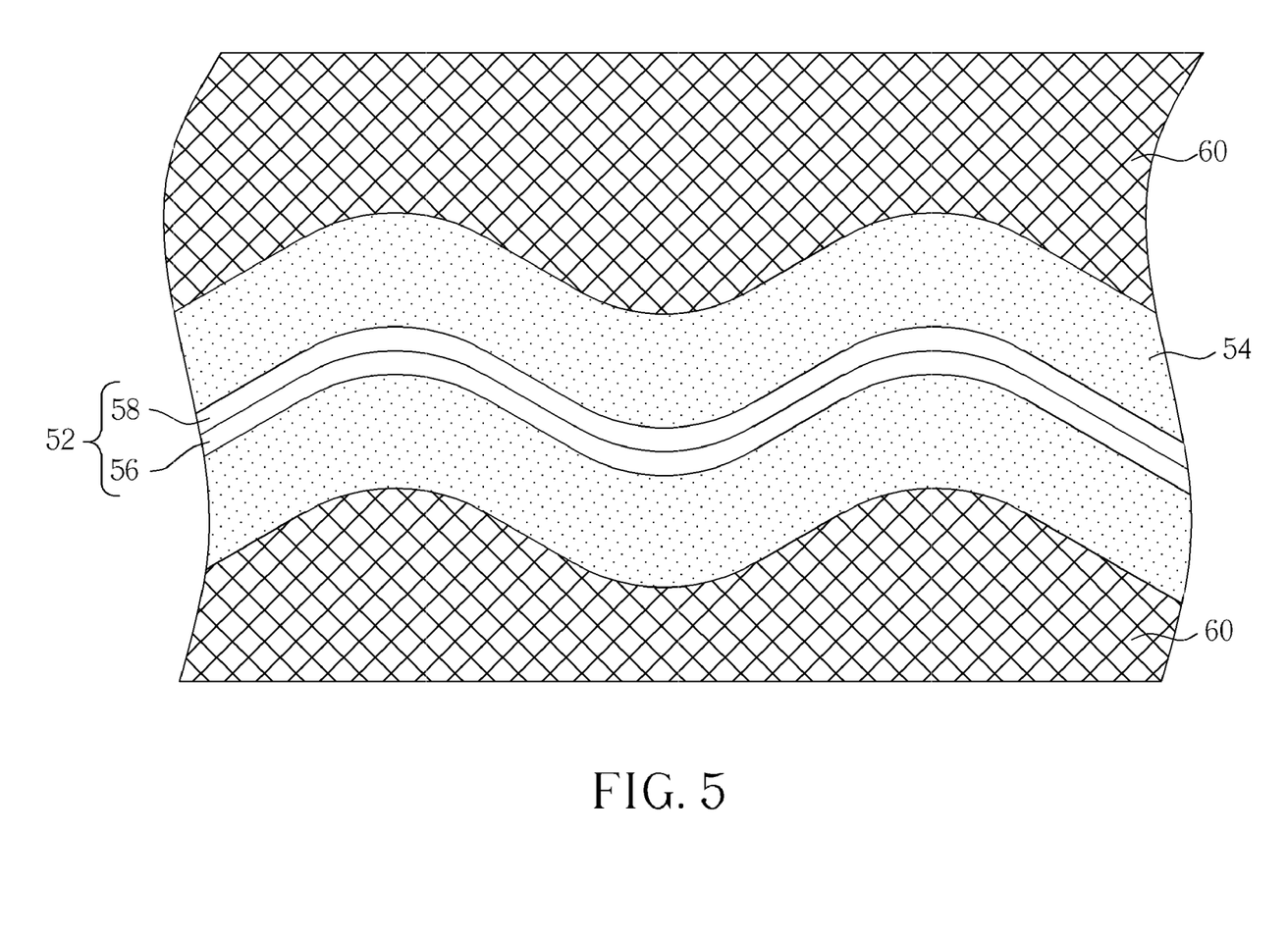
FIG. 5 is a partial cross-sectional diagram of the case structure sheathing the PLED device.

According to the aforementioned IMD process description, in the present invention, the PLED device 52 is then disposed into a mold 60 (Step 302). Since the mold 60 has a cavity 62 corresponding to a predetermined shape, e.g. a corrugated shape shown in FIG. 2, and the PLED device 52 is flexible, disposal of the PLED device 52 into the mold 60 may be as shown in FIG. 4. After disposing the PLED device 52 into the mold 60, the mold 60 may be utilized to sheathe the PLED device 52 with transparent plastic material in an injection-molding manner (Step 304). At this time, the melted transparent plastic material may sheathe the PLED device 52 according to the shape of cavity 62 (as shown in FIG. 5). After the melted transparent plastic material in the mold 60 is cooled down and solidified, the case structure 52, which sheathes the PLED device 52, is formed accordingly as shown in FIG. 2.

It should be mentioned that the structural design of the case structure 54 is not limited to the said corrugated shape shown in FIG. 2 in the present invention. In other words, no matter what shape a cavity of a mold has, the case structure 54 may be formed by the said IMD process as long as the PLED device 52 can use its flexibility to match the shape of the cavity in the mold. In such a manner, not only may the related application flexibility of the light-emitting case be increased, but also the problem of complicated light-guide structural design and uneven brightness distribution on a curved surface mentioned in the prior art may be avoided.

Figure 6:
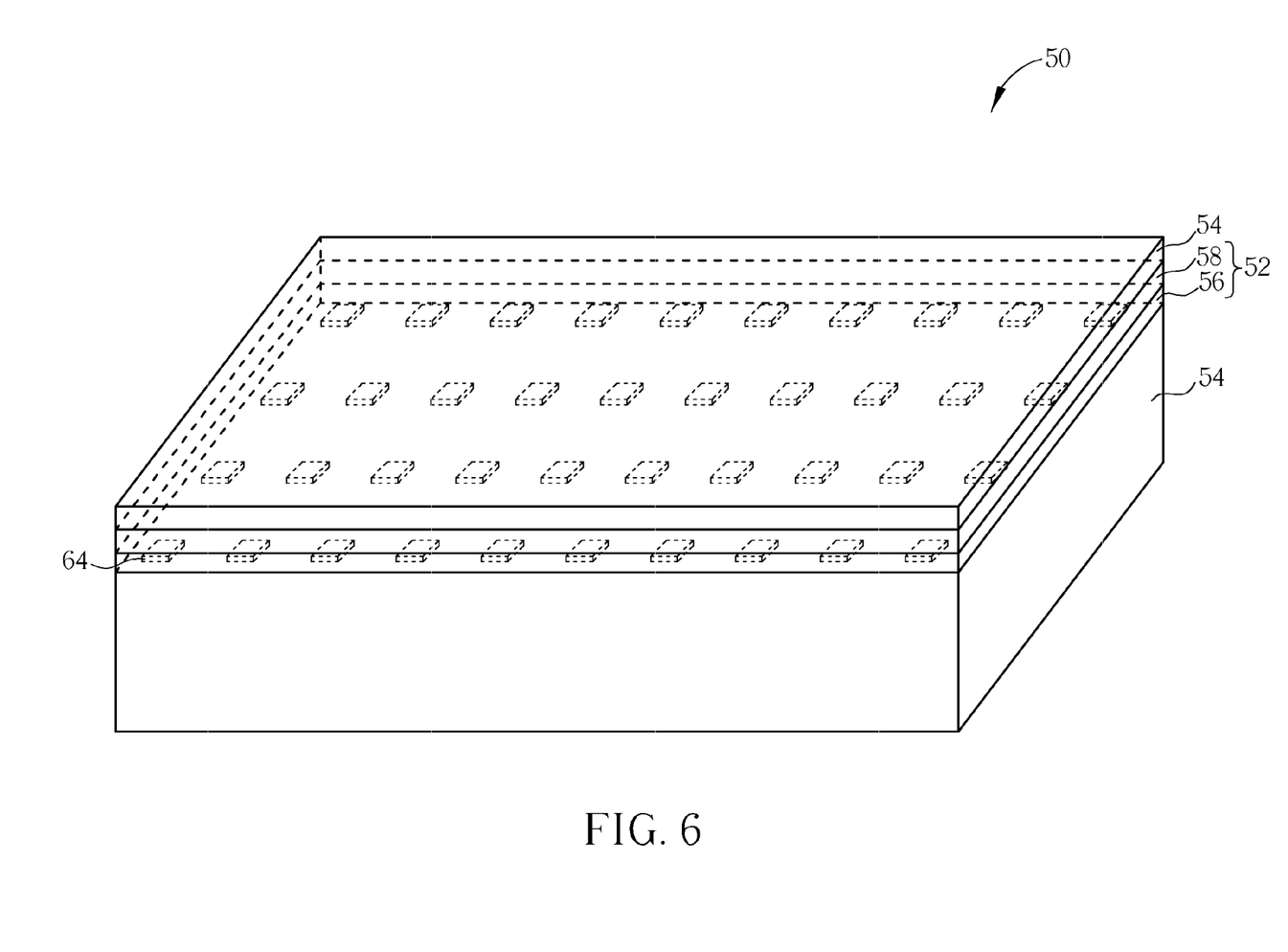
FIG. 6 is a diagram of a light-emitting layer according to another embodiment of the present invention.
Figure 7:
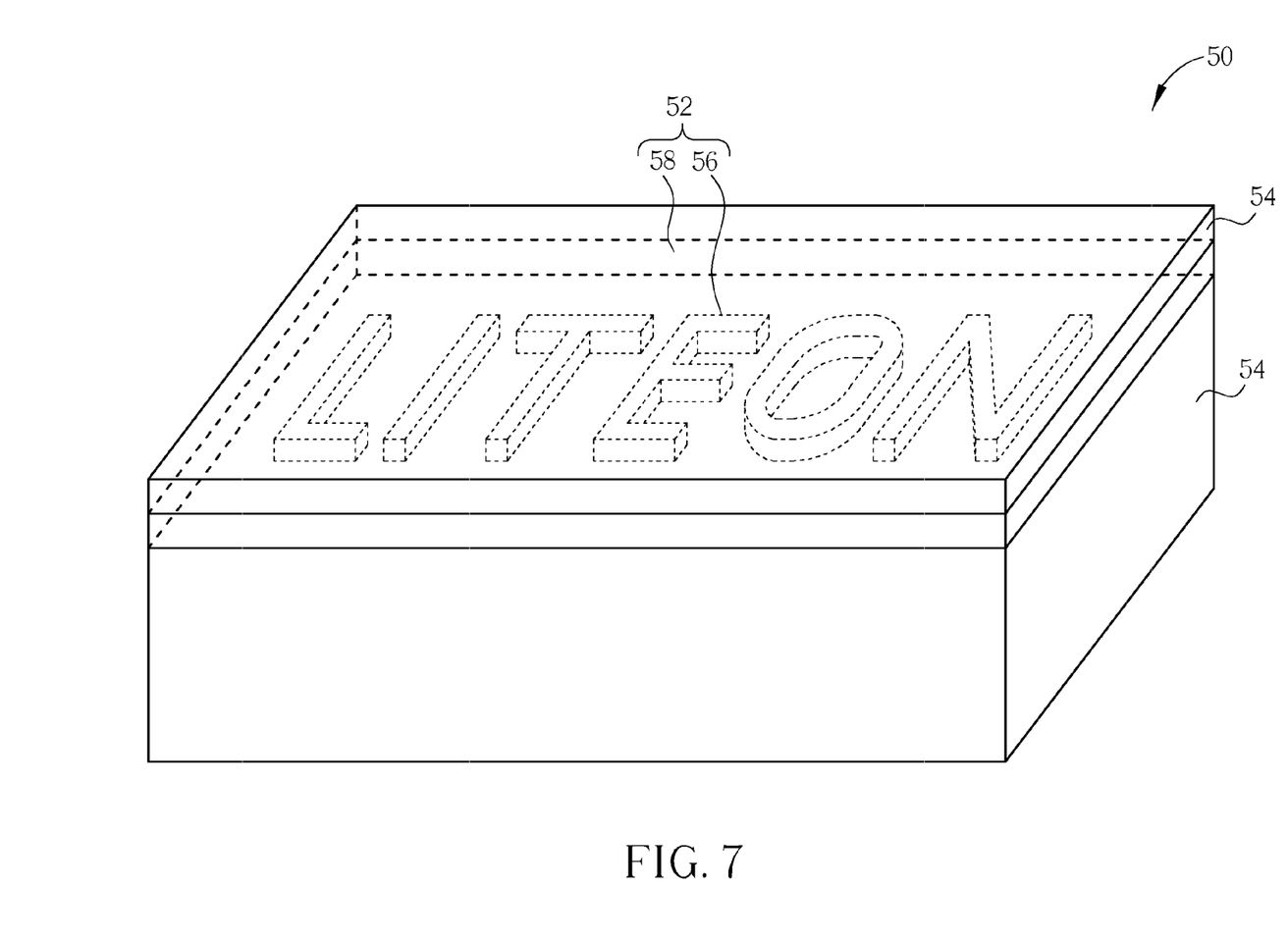
FIG. 7 is a diagram of a light-emitting layer according to another embodiment of the present invention.

Furthermore, the light-emitting layer 56 of the PLED device 52 is not limited to the said structural design as shown in FIG. 2. In condition of the case structure 54 being a planar structure, the light-emitting layer 54 may be composed of a plurality of light-emitting blocks 64, as shown in FIG. 6. The electrode set 58 may be used for selectively controlling the plurality of light-emitting blocks 64 in the light-emitting layer 56 to emit light or not, so that dynamic or static images may be formed correspondingly by some of the light-emitting blocks 64 which emit light. The electrode set 58 may also be used for driving each light-emitting block 64 to emit light at the same time or flash intermittently for temporary illumination or warning. Furthermore, each light-emitting block 64 may be also designated to emit light of one specific color. Thus, the said images may have a color gradient effect in a manner of different light-emitting blocks 64 emitting light of different colors. However, in the present invention, each light-emitting block 64 may also emit light of the same color for monochrome display. As for which design is utilized, it depends on practical application. On the other hand, the light-emitting layer 56 may also be arranged in a specific pattern (e.g. a "LITEON" pattern shown in FIG. 7), so that the specific pattern may be illuminated correspondingly when the light-emitting layer 56 emits light. Furthermore, the light-emitting module 50 may also be used for controlling brightness of the light-emitting layer 56 in an electric-current adjustment manner. The said method for controlling the light-emitting layer may be a common circuit logic control method in PLED application, and the related description is therefore omitted herein.

Compared with the prior art, in which a light guide mechanism is needed to make a spot light source generate wide-range light, or reflection pads are needed to solve the uneven brightness distribution problem when a spot light source emits light on a curved surface, the present invention utilizes an IMD process to sheathe a PLED device with a case of an electronic device. In other words, no matter whether the case of the electronic device has a planar surface or a curved surface, the PLED device can be sheathed with the case of the electronic device by the said IMD process as long as the PLED device can use its flexibility to conform its shape to an inner structure of a mold corresponding to the case of the electronic device. In summary, a light-emitting module provided by the present invention may utilize self-illumination and flexibility characteristics of a PLED device and an IMD process to avoid use of a complicated light guide mechanism, which is needed to make a spot light source generate wide-range light, and solve an uneven brightness distribution problem when a spot light source emits light on a curved surface.

Those skilled in the art will readily observe that numerous modifications and alterations of the device and method may be made while retaining the teachings of the invention.

What is claimed is:

1. A method for manufacturing a light-emitting case comprising:
   providing a PLED (Polymer Light Emitting Diode) device, the PLED device at least having a light-emitting layer and an electrode set formed on the light-emitting layer;
   disposing the PLED device into a mold, the mold having a cavity corresponding to a corrugated shape, and the shape of the PLED device corresponds to the corrugated shape due to the flexibility thereof; and
   utilizing the mold to sheathe the PLED device with transparent plastic material in an injection-molding manner;
   wherein the formed transparent plastic material has a geometric appearance corresponding to the corrugated shape and us formed as a case structure;
   wherein the PLED device is sheathed in the case structure to form the light-emitting case.

2. The method of claim 1, wherein providing the PLED device at least having the light-emitting layer and the electrode set formed on the light-emitting layer comprises providing the PLED device at least having a plurality of light-emitting blocks.

3. The method of claim 2, wherein providing the PLED device at least having the plurality of light-emitting blocks comprises providing the PLED device at least having the plurality of light-emitting blocks, each emitting light of one specific color.

4. The method of claim 1, wherein providing the PLED device at least having the light-emitting layer and the electrode set formed on the light-emitting layer comprises providing the PLED device at least having the light-emitting layer arranged in a specific pattern.

5. The method of claim 1, wherein disposing the PLED device into the mold having the cavity corresponding to the corrugated shape comprises disposing the PLED device into the mold having the cavity corresponding to a curved-surface shape.

6. The method of claim 1 further comprising utilizing the electrode set to control brightness of the light-emitting layer.

7. A light-emitting case having a PLED, the light-emitting case comprising:
  a PLED device comprising:
    a light-emitting layer; and
    an electrode set electrically connected to the light-emitting layer, the electrode set used for controlling the light-emitting layer to emit light or not; and
  a case structure formed with the PLED device in a mold by an injection molding method, the mold having a cavity corresponding to a corrugated shape, the shape of the PLED device corresponds to the corrugated shape due to the flexibility thereof, the formed case structure sheathing the PLED device and having a geometric appearance corresponding to the corrugated shape;
  wherein the PLED device is sheathed in the case structure to form the light-emitting case.

8. The light-emitting case of claim 7, wherein the light-emitting layer comprises a plurality of light-emitting blocks.

9. The light-emitting case of claim 8, wherein each light-emitting block emits light of one specific color.

10. The light-emitting case of claim 7, wherein the light-emitting layer is arranged in a specific pattern.

11. The light-emitting case of claim 7, wherein the corrugated shape has a curved-surface.

12. The light-emitting case of claim 7, wherein the case structure is made of transparent plastic material.

13. The light-emitting case of claim 12, wherein the case structure is made of ABS (Acrylonitrile-Butadiene-Styrene) material.

14. The light-emitting case of claim 7, wherein the electrode set is further used for controlling brightness of the light-emitting layer.

* * * * *